United States Patent [19]

Gerhard

[11] Patent Number: 4,506,428

[45] Date of Patent: Mar. 26, 1985

[54] METHOD OF FORMING A PREFABRICATED CONCRETE PANEL

[75] Inventor: Robert E. Gerhard, Wolcott, Conn.

[73] Assignee: Bank Constructors, Inc., Wolcott, Conn.

[21] Appl. No.: 465,816

[22] Filed: Feb. 14, 1983

[51] Int. Cl.$^3$ .......................... B23P 11/02; B28B 9/04

[52] U.S. Cl. ...................................... 29/446; 264/228; 52/741

[58] Field of Search ................ 264/162, 228; 249/135, 249/834, 96, 97, 88; 29/446; 52/741, 745

[56] References Cited

U.S. PATENT DOCUMENTS

| | | | |
|---|---|---|---|
| 2,210,553 | 8/1940 | Miller | 264/228 |
| 2,234,663 | 3/1941 | Anderegg | 264/228 |
| 2,921,354 | 1/1960 | Pankey et al. | 249/96 |
| 3,182,948 | 5/1965 | Lawrence | 249/96 |
| 3,555,763 | 1/1971 | Bloxom | 264/338 |
| 3,609,935 | 10/1971 | Thomas | 52/745 |
| 3,685,783 | 8/1972 | Hilson | 249/97 |
| 3,829,540 | 8/1974 | Cox | 249/97 |
| 4,125,580 | 11/1978 | Lippert | 264/228 |
| 4,409,764 | 10/1983 | Wilnau | 52/741 |

FOREIGN PATENT DOCUMENTS

| | | | |
|---|---|---|---|
| 2089714 | 6/1982 | United Kingdom | 264/228 |

*Primary Examiner*—Howard N. Goldberg
*Assistant Examiner*—Steven E. Nichols
*Attorney, Agent, or Firm*—Lawrence Hager

[57] ABSTRACT

Prefabricated concrete wall panel and method of forming same having a continuous peripheral metallic skeletal panel frame with its opposite sides being adjustably disposed/constrained during fabrication to provide a substantially parallelogram shaped wall panel. A plurality of spaced transversely extending, for example, nut and bolt type clamping means are disposed between opposite sides of the panel frame at least during the fabrication process to maintain the sides generally straight and parallel until the concrete has attained sufficient set strength. A plurality of hook means are affixed to opposite sides of the panel frame and extend inwardly into the concrete for holding the parallelism of the opposite sides following removal of the clamping means.

14 Claims, 7 Drawing Figures

METHOD OF FORMING A PREFABRICATED CONCRETE PANEL

FIELD OF THE INVENTION

The invention relates to a prefabricated panel and method of constructing such panels. The invention also relates to a method of forming walls by employing these panels.

BACKGROUND OF THE INVENTION

Various types of prefabricated construction have hitherto been proposed such as modular units, prefabricated trusses and deck panels.

In one prior art prefabrication method, such as described in U.S. Pat. No. 3,555,763 issued Jan. 19, 1971 to David E. Bloxom, panels are formed by:

(a) preparing a plurality of outer metallic skeletal panel frames, each being prepared by joining metallic channels at the periphery of the panel frames, bowing the channels in at the center of the sides to effect a dimension in width at the center less than the width at the top and bottom of the panel frames, and affixing metal reinforcing bars between opposite channel sides of the panel frame (b) placing the skeletal panel frame on a bed and pouring a lightweight concrete slurry within the panel frame to produce a prefabricated panel having the metallic channel at its periphery; and (c) positioning the panels on a foundation and joining the metallic channels.

The obvious disadvantages of this known prefabrication panel are that an improper bowing can not be corrected once the concrete has been poured, which may result in loss of both time and materials, and that inward (concavity) bowing of support channels inherently results in a weaker panel and structure. This condition will exist in particular where a door or similar opening is provided within such a panel in that the diminished concrete portions of the panel about the opening may crack and be unable to withstand the inward stress from further bowing of the channels under the weight of the structure.

The present invention involves a novel combination of features combined in such a way as to afford a very efficient, cost effective solution to the difficulties and problems encountered with the prior art, as will become apparent as the description proceeds.

For example, in contrast to the prior art, the present invention provides a method of forming prefabricated panels whereby their opposite support channels may be adjustably constrained during fabrication to provide a substantially parallelogram shaped wall panel. In this manner, the vertical support channels are caused to maintain a substantially straight and parallel disposition to facilitate wall construction and strength. A further feature of the present invention is the provision of a plurality of hook means affixed to the side channels and extending into the concrete for holding the channels in their straight and generally parallel orientation about the hardened concrete. Another feature which may be utilized is a re-usable height adjustable concrete joint edge forming plate which is bolted onto the channels and extends upwardly to form a ledge retainer for the concrete slurry.

SUMMARY OF THE INVENTION

Generally speaking, and in accordance with the invention, there is provided a method of forming prefabricated concrete panels, comprising:

forming an outer generally rectangular metallic skeletal panel frame (10), for example, by welding channels together;

affixing a plurality of retainer means (15) to each side channel (11, 12) of said panel frame;

affixing a plurality of elongate rods or bars (18) at one end thereof to a side channel (11) with their respective other ends having a threaded nut portion (23) cantilevered into juxtaposition with the opposite side channel (12);

forming a plurality of discrete holes (27) in the opposite side channel (12) each being aligned with a respective nut end portion of said rods;

inserting a plurality of bolt means into a respective hole in the opposite side channel and into screw like engagement with a respective nut end portion of said rods;

rotating said bolt means whereby the opposite side channels (11,12,13, and 14) may be adjustably constrained/disposed into substantial parallelism and/or straightness;

pouring a lightweight concrete slurry (39) within the panel frame;

rotating said bolt means as and if necessary to maintain the opposite side channels in relative parallelism and/or straightness in opposition to the outward/-weight pressure on the panel frame by the concrete slurry prior to its hardening; and removing said bolt means from the panel frame following the concrete slurry attaining sufficient set strength;

whereby a prefabricated concrete panel is effected having relatively straight and parallel opposite side channels thereby facilitating wall construction and strength.

Accordingly, it is an object of the present invention to provide a method of forming wall panels.

It is a further object of the present invention to provide a method and means for adjusting the relative disposition of opposite channels of a panel frame.

It is a further object of the present invention to provide a new and improved construction method.

It is a further object of the present invention to provide a relatively economical method of forming prefabricated concrete panels having a peripheral metallic frame.

It is a further object of the invention to provide a method and apparatus for forming an upstanding or projecting concrete joint portion of a concrete panel.

Another object of the invention is the provision of an insulated prefabricated concrete panel.

Another object of the invention is to provide a method for adjustably constraining the relative disposition and/or straightness and/or parallelism of the opposite side channels of a concrete panel having a metallic skeletal peripheral frame member.

BRIEF DESCRIPTION OF THE DRAWINGS

The foregoing and other objects of this invention, which will become more fully apparent from the following detailed description, may be achieved by means of the exemplifying apparatus depicted and set forth in this specification in connection with the accompaying drawings. Similar reference numerals refer to similar parts throughout.

DESCRIPTION OF THE PREFERRED EMBODIMENTS

Figure 1:
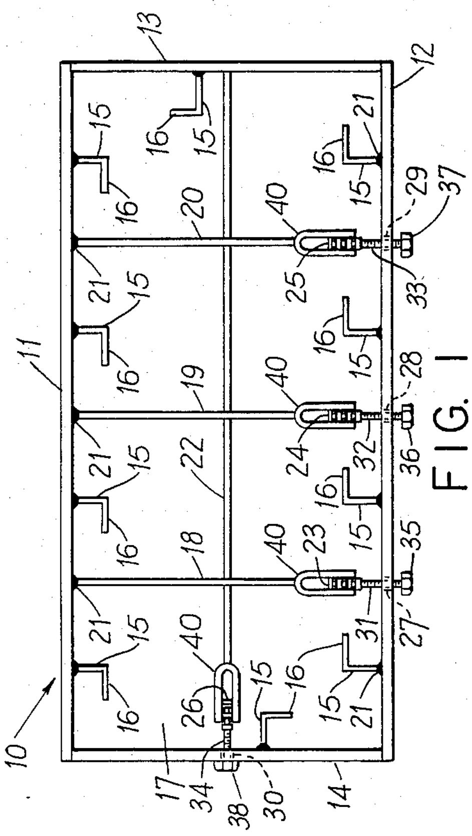
FIG. 1 is a top plan view of an outer metallic skeletal panel frame employed in an embodiment of the invention.
Figure 3:
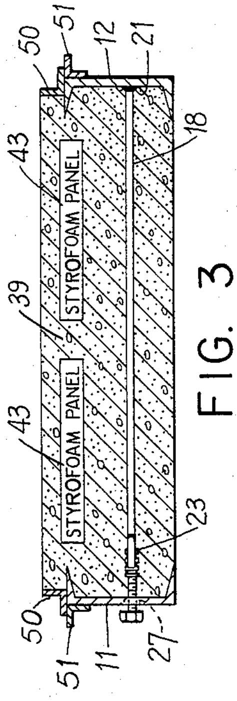
FIG. 3 is a cross-sectional view of the panel frame of FIG. 1 showing a concrete slurry and insulation panels disposed therein.

With reference to FIGS. 1 and 3, a first embodiment of the outer metallic skeletal panel frame 10 is shown generally comprising four metallic channels 11, 12, 13 and 14 welded together at their ends to generally form a rectangular peripheral panel frame. A plurality of hooks 15 are welded to the inside surfaces of the opposite side channels 11 and 12. The hooks 15 may be formed, for example, by bending sections of a reinforcing bar with the bent portion 16 extended within the interior space 17 defined by the panel frame 10. A plurality of, for example, reinforcing rods 18, 19 and 20 are welded 21 at one end to side channel 11 and are cantilevered transversely toward the opposite side channel 12.

A longitudinally extended rod 22 is similarly affixed to channel 13 and extends towards its opposite end/side channel 14.

Each cantilevered end portion of rods 18, 19, 20 and 22 has a threaded nut like member 23, 24, 25 and 26, respectively, formed/attached thereat. The rods 18, 19, 20 and 22 may comprise a pipe like device having an internal threaded end, or be formed by reinforcing rods having a nut member welded to each of their respective ends. The nut members 23 through 26 may, for example, comprise a Ferrule Loop Insert type fastener with their loop sections 40 being welded to a respective rod 18,19 20 and 22. Such fastening inserts are available from the Dayton Sure-Grip & Shore Company under the designation F-64 Ferrule Loop Insert. The rods and attached fastening (nut) inserts are dimensioned and adapted such that the threaded nut like members 23, 24, 25 are in juxtaposition with an opposite side/end channel 12. Likewise, rod 22 is adapted to dispose nut member 26 in juxtaposition with side/end channel 14.

A plurality of holes 27,28,29 and 30 are drilled in the side/end channels 12 and 14 each being aligned with a respective nut member 23,24,25 and 26. The holes 27,28,29 and 30 are each dimensioned to receive the threaded shank portion of a respective bolt 31,32,33 and 34. The bolts 31 through 34 are inserted such that their threaded shank portions engage with a respective nut member 23 through 26 with screwlike rotation of the bolts. The head portions 35 through 37 of the respective bolts abut with side channel 12, and head portion 38 abuts with side channel 14.

The bolts 31 through 33 are rotated whereby the opposite side channels 11 and 12 are clamped or constricted in spaced substantially parallel relationship. Likewise, bolt 34 is rotated such that the clamping or constricting force, via rod 22 and nut member 26, effects a straightening and parallel disposition of side channels 13 and 14.

A bed (not shown) is prepared for the panel frame, for example, as is described in U.S. Pat. No. 3,555,763. Briefly stated, this may be done by forming a horizontal surface such as by pouring a substantially planar concrete slab somewhat larger in dimension than the panel frame and covering the bed surface with a bond breaker. The conventional bond breaker referred to by the tradename DEBOND may be utilized.

The panel frame 10 is then placed on the bed. If a shadowline joint between wall panels is desired, angle iron 50, as illustrated in FIG. 3, may be temporarily welded to the side channels 11 and 12. Alternatively, a readily attachable/detachable joint forming plate 41 or 42 may be bolted to the side channel 12 by means of bolts 31, 32 and 33, as will be described in more detail hereafter. End plates are attached/mounted on side/end channels 13 and 14 such that a concrete containing border is formed about the panel frame 10. Next, a generally lightweight concrete slurry 39 is poured within the panel frame 10 to fill the interior space 17 and upward space defined by the attached angle iron 40. If desired, insulated panels 43 may be inserted during the concrete pouring process to improve the panel's insulation rating or ability.

Shortly following the pouring of the concrete, i.e., prior to it attaining a prohibitive set strength, the relative straightness and/or parallelism of the side channels are monitored. And if bulging has occured to the panel frame 10 due to the weight-pressure of the concrete slurry 39, corrective action may be effected by means of further tightening the bolts. In this manner, the opposite side channels 11, 12 and/or 13, 14 are inwardly constrained, i.e., pulled together, to reduce or substantially eliminate the distorting effects of the concrete slurry 39 pressure on the panel frame 10.

With the concrete slurry 39 attaining a sufficient set strength, the bolts 31 through 34 are removed from the panel. The retaining hooks 15 serve to hold the side channels 11 and 12 in their generally straight and parallel disposition as previously effected by the bolt and nut clamping means. With the removal of the angle irons, the panel is ready to be positioned on a foundation (not shown) to form a wall section.

Figure 2:
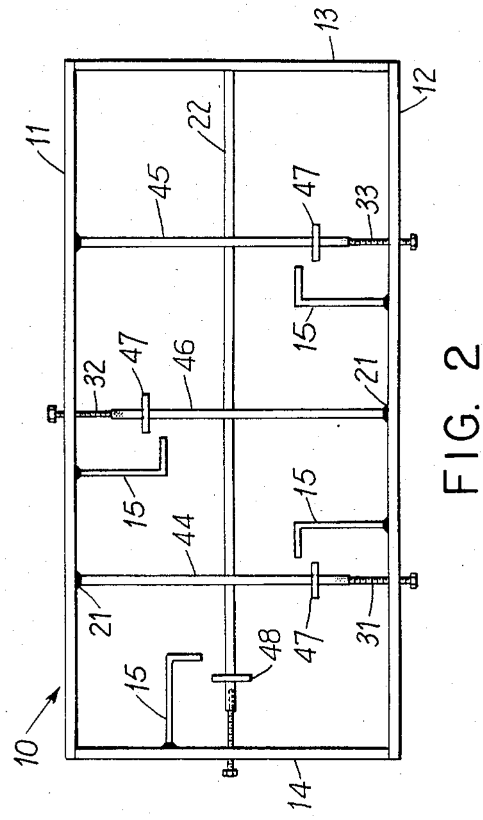
FIG. 2 is a top plan view of an alternative panel frame embodiment.

With reference now to FIG. 2, an alternative embodiment of the invention is shown. The panel of this embodiment is similar to that shown in FIG. 1 with the exception that the transverse rods 44 and 45 are affixed to side channel 11, and rod 46 is affixed to side channel 12. Each rod 44, 45 and 46 has a cross-bar or plate 47 affixed thereon, which serve to hold the side channels 11 and 12 in their generally straight and parallel disposition following the concrete attaining a sufficient set strength and with removal of the bolts 31,32 and 33. Likewise, a cross-bar 48 may also be provided on the longitudinal rod 22.

If desired, a plurality of hooks 15 may also be utilized, as noted above, to provide additional holding of the panel frame 10 in the desired rectangular form about the hardened concrete.

Figure 5B:
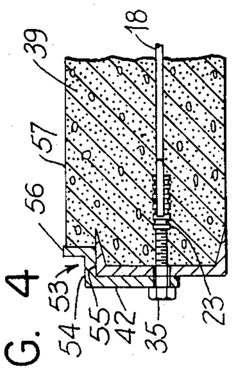
FIGS. 5*a* and 5*b* are end views of side channel portions of the panel frame each having a readily removable/adjustable concrete joint forming plate mounted thereon.
Figure 5A:
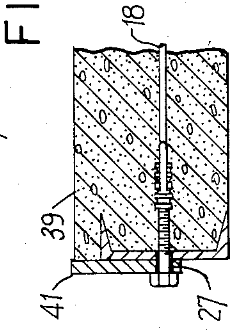

With reference to FIGS. 5*a* and 5*b* a partial cross sectional views of joint forming plates is depicted, in accordance with a further embodiment/feature of the present invention. Typically, a shadowline joint panel is formed by welding two elongate sections of angle iron 50 and 51 along the length of each panel frame side channel, for example, 11 and 12, as shown in FIG. 3. Additional plates or angle irons (not shown) are welded along the end channels, for example, 13 and 14, whereby an upstanding peripheral ledge is formed about the panel frame. The concrete slurry 39 is poured within the panel frame to substantially fill the panel frame and the upper space formed by the angle irons 50 and 51 and end plates with concrete slurry 39. With the concrete slurry 39 attaining a sufficient set strength, the angle irons 50 and 51 and end plates are removed. The obvious disadvantages of this typical method of forming a shadowline joint panel are the cost of welding the sections of angle iron and/or plates on the panel frame; the time and expense to break the welds to remove the angle irons and plates; and the expense of periodically replacing the angle irons and plates which may not be reusable due to bending etc. resulting from the force required to break the temporary welds in removing the angle iron and plates from the panel frame.

Figure 6:
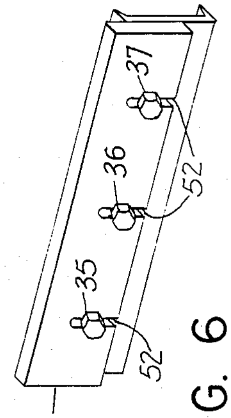
FIG. 6 is a perspective view of the plate member shown in FIG. 5*b*.

Each reveal joint forming plate 41 comprises a straight flat steel plate, for example, of 5/16 inch thickness, having a plurality of slots 52 each adapted to receive a respective bolt, for example, bolt 31,32 and 33, with its head portion 35,36 and 37 extending beyond the wall portions of the plate 41 which form the slots 52 (see FIG. 6). An adjustable plate 41 may be mounted on each side/end channel (not shown) to form an upper peripheral ledge about the panel frame. This may be effected by the use of additional transverse and longitudinal rods 44,46 and 22 cantilevered alternately from opposite side/end channels with respective bolts to provide sufficient mounting at each side/end channel for holding each side/end joint forming plate. Each side/end joint forming plate has a length substantially equal to a respective side/end channel to which it is bolted during fabrication of the concrete panel.

With reference to FIG. 5*b*, another embodiment of a joint forming plate is shown. The joint forming plate 42 of this embodiment is similar to that shown in FIGS. 5*a* and 6, with the exception that the upper portion 53 bent/adapted to effect a shadowline panel joint. The upper portion 53 of the plate 42 has a horizontal ledge 54 which extends inwardly and is surmountable along the inward ridge portion 55 of a side channel, and has a vertical wall member 56.

In order to form a panel to provide a shadowline joint between juxtaposed wall panels (see FIG. 4), a pair of shadowline plates 42 are mounted each on a respective side channel 11 and 12 to form an inner concrete vertical wall portion 57. A pair of straight plates 41 are mounted each on a respective end channel 13 and 14. With the concrete slurry 39 attaining a sufficient set strength, the retaining bolts and plates 41 and 42 are removed from the panel.

In this manner, the temporary clamping means comprising the bolts 31–38 and rods 18–20, 22 or 45–46, serves the dual function of adjustably straightening the channels and adjustably mounting the plates 41 and/or 42 during the fabrication process, while also obviating the temporary and relatively expensive welding of angle iron to effect the reveal or shadowline joint type panels.

Figure 4:
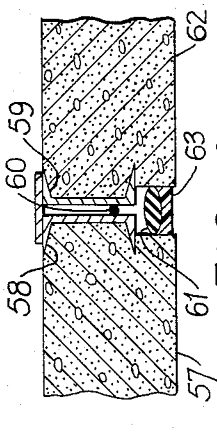
FIG. 4 is a partial cross-sectional view of a wall formed by joining two or more prefabricated panels.

With the concrete slurry cured to a desired set strength and the plates 41 and 42, or angle iron 50 and 51 being removed, the prefabricated concrete panel(s) is ready to be positioned on a foundation (not shown) adjacent one or more similarly constructed panels as illustrated in the partial cross section wall view of FIG. 4. A joint between the metallic channels 58 and 59 of juxtaposed panels may be formed, for example, by welding as shown by flux 60 or by bolting or by other conventional means.

A backer-rod 61 is wedged between the spaced outer concrete wall portions 57 and 62 created between juxtaposed panels, for example, within the outer shadowline joint. The exterior joint portion is then substantially filled with a sealant or caulking material 63. The interior joint may be masked from view by a conventional tape. The tape should readily adhere to the inner surface of the metallic channels, and may be a multi-surface foil type tape as is available from the 3M Company.

The concrete slurry 39 may be poured within the panel frame and the bordering joint forming plates in conventional manner such as is described in U.S. Pat. No. 3,555,763, the teachings of which are incorporated herein by reference to the extent necessary. Briefly stated, the panel frame 10 is positioned on a bed which has been coated with a bond breaker such as DEBOND available from L&M Construction Chemicals, Inc. having orifices in Omaha, Nebr. A lightweight concrete slurry is then poured within the panel frame 10 to produce a prefabricated panel having metallic channels forming its periphery. The concrete slurry is poured to the full depth of the panel frame and, if desired, also the full depth of angle iron joint forming members welded thereon to produce a full-thickness prefabricated panel.

While the invention has been described with respect to several preferred embodiments, it should be apparent to those skilled in the art that numerous modifications may be made thereto without departing from the spirit and scope of the invention.

I claim:

1. A method of forming a panel, comprising:
   - forming an outer generally rectangular metallic skeletal panel frame;
   - affixing a plurality of discrete adjustable clamping means between opposite side members of the panel frame;
   - pouring a lightweight concrete slurry within the panel frame; and
   - adjusting the clamping means to apply constraining force to the opposite side members of the panel frame subsequent to pouring but prior to hardening of the concrete slurry.

2. A method of forming a panel as in claim 1, including the step of:
   - affixing a plurality of retainer means to each side of the panel frame.

3. A method of forming a panel as in claim 1, including the steps of:
   - bolting a joint forming plate about the periphery of the panel frame such that an upper concrete retaining ledge is formed;
   - pouring the lightweight concrete slurry to substantially fill the interior space defined by the panel frame and to the full thickness thereof and to form an outer portion having a concrete joint surface contoured by the joint forming plate;
   - unbolting and removing the joint forming plate with the concrete attaining a sufficient set strength.

4. A method of forming a panel as in claim 3, where:
   - a discrete joint forming plate is bolted to each side of the panel frame for defining an outer substantially rectangular concrete slurry contouring retaining ledge about the panel frame.

5. A method of forming a panel as in claim 4, wherein:

each joint forming plate longitudinally extends in juxtaposition with a respective side of the panel frame for providing a reveal joint forming concrete slurry retaining border.

6. A method of forming a panel as in claim 4, wherein:

at least two of the joint forming plates each have an inwardly contoured upper portion longitudinally extending and surmounted along a respective side of the panel frame for providing a shadowline joint forming concrete slurry retaining border.

7. A method of forming a panel as in claim 1, including the step of:

embedding an insulation panel within the concrete slurry poured within the panel frame.

8. A method of forming a panel as in claim 1, wherein:

each discrete clamping means comprises a reinforcing bar having one end affixed to one side of the panel frame and its other end having a threaded nut like member affixed thereto and being disposed in proximity with the opposite side of the panel frame having a hole formed therein and generally aligned with the nut like member, and a bolt means having a head portion abutting the exterior wall portions of the panel frame forming the hole with a threaded shank portion extending inwardly into engagement with the nut like member;

whereby rotation of the bolt means effects adjustable constraining force on the opposite sides of the panel frame prior to the concrete slurry being cured.

9. A method of forming a prefabricated panel, comprising:

forming an outer generally rectangular metallic skeletal panel frame by welding channel sections together;

affixing at least one retainer means to an interior surface of one or more of the channel sections;

affixing at least one elongate rod at one end thereof to an interior surface of a first side channel section with its other end supporting a threaded member in juxtaposition with a second side channel section of the panel frame;

providing a hole in said second side channel section being aligned with the threaded member at the end of said rod;

inserting a mating threaded member within the hole of said second side channel section for threaded engagement with the threaded member at the end of said rod, said mating threaded member having a head portion being rotatably disposed without the panel frame for urging said second side channel section inwardly with rotation thereof;

rotating said mating threaded member in threaded engagement with the threaded member at the end of said rod whereby portions of said first and second side channel sections are inwardly disposable to effect substantial parallelism and straightness of said first and second side channel sections;

positioning the panel frame on a substantially horizontal surface and pouring a lightweight concrete slurry within the panel frame generally to the full depth thereof;

monitoring the parallelism and/or straightness of said first and second side channel sections within a relative short period following the pouring of the concrete slurry within the panel frame;

rotating said mating threaded member to maintain said first and second side channel sections at relative parallelism and/or straightness prior to curing of the concrete slurry; and removing the mating threaded member from the panel frame following the concrete slurry attaining a sufficient set strength;

whereby a prefabricated concrete panel having a metallic peripheral frame with relatively straight and parallel first and second side channel sections is formed.

10. A method of forming a prefabricated panel as in claim 9, wherein:

the retainer means comprises a section of reinforcing bar welded at one end to a side channel section and having an intermediate bent portion for holding the respective side channel section in fixed disposition relative to the concrete with attaining a sufficient set strength.

11. A method of forming a prefabricated panel as in claim 9, including the steps:

affixing a plurality of the elongate rods each having a respective supported threaded member cantilevered transversely within the panel frame;

affixing at least one elongate rod with a respective supported threaded member cantilevered longitudinally within the panel frame;

providing a plurality of holes in the channel sections each aligned with a respective supported threaded member;

inserting a plurality of mating threaded members each within a respective hole in a channel section.

12. A method of forming a prefabricated panel as in claim 11, including the steps:

welding a loop ferrule insert at the end of each elongate rod to provide said supported threaded members;

inserting a coil bolt having self-cleaning threads within each hole in the channel sections and screw threaded within a respective loop ferrule insert.

13. A method of forming a prefabricated panel as in claim 12, including the steps:

mounting four elongate joint forming plate means each having a plurality of slots for receiving a respective one of said coil bolts whereby each plate means is temporarily bolted to a respective channel section forming an upper concrete contour peripheral ledge;

pouring the lightweight concrete slurry to the full depth of the panel frame and the peripheral ledge;

unbolting and removing the plate members and coil bolts following the concrete attaining a sufficient set strength.

14. A method of forming a prefabricated panel, comprising the steps:

forming an outer generally rectangular metallic skeletal panel frame;

affixing a plurality of discrete adjustable clamping means between opposite side members of the panel frame;

adjusting the clamping means to apply constraining force to the opposite side members of the panel frame;

pouring a lightweight concrete slurry within the panel frame; and further adjusting of said clamping means subsequent to pouring but prior to slurry hardening.

* * * * *